(12) United States Patent
De Rycke et al.

(10) Patent No.: US 12,054,983 B2
(45) Date of Patent: Aug. 6, 2024

(54) PREACTIVE OXYGEN MODIFICATION TO FORM PERIPHERAL SEAL FOR VACUUM INSULATED GLAZING (VIG) UNIT

(71) Applicant: VKR HOLDING A/S, Hørsholm (DK)

(72) Inventors: Thibault De Rycke, Hørsholm (DK); Karsten Hansgaard Nielsen, Hørsholm (DK); Simon Johnsen, Hørsholm (DK); Søren Vejling Andersen, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 739 days.

(21) Appl. No.: 17/260,835

(22) PCT Filed: Jun. 21, 2019

(86) PCT No.: PCT/EP2019/066425
§ 371 (c)(1),
(2) Date: Jan. 15, 2021

(87) PCT Pub. No.: WO2020/020542
PCT Pub. Date: Jan. 30, 2020

(65) Prior Publication Data
US 2021/0293079 A1    Sep. 23, 2021

(30) Foreign Application Priority Data
Jul. 23, 2018   (DK) .............................. PA201870498

(51) Int. Cl.
*E06B 3/673*    (2006.01)
*E06B 3/66*     (2006.01)
*E06B 3/677*    (2006.01)

(52) U.S. Cl.
CPC ........ *E06B 3/67334* (2013.01); *E06B 3/6612* (2013.01); *E06B 3/6733* (2013.01); *E06B 3/6775* (2013.01)

(58) Field of Classification Search
None
See application file for complete search history.

(56) References Cited

U.S. PATENT DOCUMENTS

2009/0151854 A1* 6/2009 Cooper ................. C03B 23/245
                                                             156/380.9
2012/0210750 A1  8/2012 Cooper
(Continued)

FOREIGN PATENT DOCUMENTS

JP    2002187745 A    7/2002
WO    2013059087 A1   4/2013
WO    2017003659 A1   1/2017

OTHER PUBLICATIONS

International Search Report for International Application PCT/EP2019/066425, International Filing Date Jun. 21, 2019, Date of Mailing Sep. 10, 2019, 3 pages.
(Continued)

*Primary Examiner* — Queenie S Dehghan
(74) *Attorney, Agent, or Firm* — CANTOR COLBURN LLP

(57) ABSTRACT

A method of manufacturing a vacuum insulated glazing (VIG) unit, the method comprising disposing a sealing composition around a periphery of first and second substantially parallel glass panes to define a cavity and form a pre-sealed VIG unit; flowing gas comprising a reactive oxygen species into the cavity; heating the sealing composition to a first temperature; and heating the sealing composition to a second temperature to form the peripheral seal and a sealed cavity between the first and second glass panes.

18 Claims, 2 Drawing Sheets

(56) References Cited

U.S. PATENT DOCUMENTS

| | | | |
|---|---|---|---|
| 2012/0308747 A1* | 12/2012 | Dennis | E06B 3/67334 501/15 |
| 2013/0059087 A1 | 3/2013 | Veerasamy | |
| 2013/0059160 A1 | 3/2013 | Veerasamy | |
| 2013/0292000 A1 | 11/2013 | Dennis et al. | |
| 2014/0037870 A1* | 2/2014 | Petrmichl | E06B 3/6612 417/51 |
| 2017/0138115 A1* | 5/2017 | Hogan | C03C 8/24 |
| 2017/0203997 A1 | 7/2017 | Miyake et al. | |
| 2021/0115727 A1* | 4/2021 | Krisko | E06B 3/66304 |

OTHER PUBLICATIONS

Written Opinion for International Application PCT/EP2019/066425, International Filing Date Jun. 21, 2019, Date of Mailing Sep. 10, 2019, 6 pages.

* cited by examiner

PREACTIVE OXYGEN MODIFICATION TO FORM PERIPHERAL SEAL FOR VACUUM INSULATED GLAZING (VIG) UNIT

CROSS REFERENCE TO RELATED APPLICATIONS

This application is a National Stage entry application of International Application No. PCT/EP2019/066425, filed Jun. 21, 2019, which claims priority to and the benefit of Denmark Application No. PA201870498, filed Jul. 23, 2018.

BACKGROUND

Vacuum insulated glazing (VIG) units comprise a sealed cavity between two glass panes which have been evacuated to a reduced pressure such as 0.001 millibars or less. The sealed cavity in VIG units is provided by a peripheral seal which can include fused solder glass. The peripheral seal is manufactured by depositing a glass frit solution around the periphery of a glass panel and then bringing down another glass panel to sandwich the glass frit solution between the glass panes. The entire assembly can then be heated to about 500° ° C. to melt the glass frit and form the peripheral seal.

JP2002187745 discloses a method of manufacturing glass panels by hermetically sealing a part between the outer peripheral parts of both sheet glass to form a gap between both sheet glass. One sheet glass is provided with a suction hole for sucking gas out of the gap. The method includes the step of heating the entire part of the sheet glass and sucking away the gas in the gap through the suction hole, and then sealing the suction hole in the reduced pressure state of the gap, in which gaseous ozone OG is supplied to come into contact with the surface of the sheet glass on the gap side in the baking process step.

The high temperatures and extended heating times that are necessary can however have deleterious effects on the glass panes. For example, tempered glass panes can lose their temper strength upon exposure to high temperature for extended periods. Coatings such as low-E coatings can also be degraded by the high temperatures.

Accordingly, there remains a need for improved processing conditions during the manufacture of the peripheral seal for a VIG unit.

BRIEF DESCRIPTION

According to one or more embodiments, a method of manufacturing a vacuum insulated glazing (VIG) unit comprises disposing a sealing composition around a periphery of first and second substantially parallel glass panes to define a cavity and form a pre-sealed VIG unit; flowing gas comprising a reactive oxygen species into the cavity; heating the sealing composition to a first temperature; and heating the sealing composition to a second temperature to form the peripheral seal and a sealed cavity between the first and second glass panes.

Flowing a gas comprising a reactive oxygen species into the cavity before and/or during heating of the sealing composition to the first temperature, normally reduces the temperature required for heating the sealing composition to form the peripheral seal, i.e. the second temperature is lowered compared to manufacturing methods where a gas comprising reactive oxygen is not flowed into the cavity.

Some sealing materials or sealing compositions can degrade at higher temperatures. Further, high temperature processing can reduce the strength of tempered glass panes. Thus, lowering the sealing temperature may be advantageous.

By the terms first temperature and second temperature is also included a method where the temperature is increased from a starting temperature to the first temperature and further to the second temperature without a discontinuation of the increase in the temperature. Thus, the transition from starting temperature to the first temperature and to the second temperature may be continuous.

According to one or more embodiments, a vacuum insulated glazing (VIG) unit is manufactured according to the method disclosed herein.

The above described and other features are exemplified by the following figures and detailed description.

BRIEF DESCRIPTION OF THE DRAWING

The following figure is exemplary of one or more embodiments.

DETAILED DESCRIPTION

Figure 1:
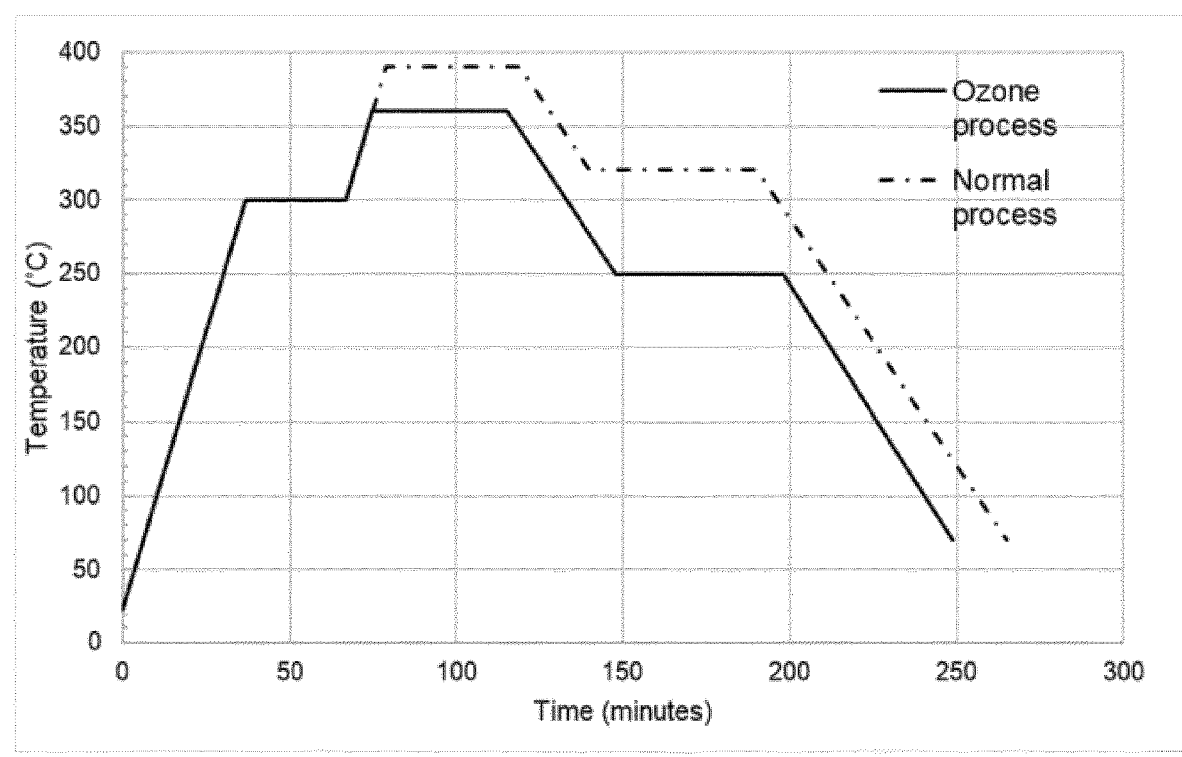
FIG. 1 is a graph of temperature (C) versus time (minutes) according to embodiments herein, and shows the heating process during the manufacture of VIG units.

Exemplary embodiments will now be described more fully hereinafter with reference to the accompanying drawings that are schematic illustrations of idealized embodiments, wherein like reference numerals refer to like elements throughout the specification. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary embodiments of the present disclosure.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof. Reference throughout the specification to "one or more embodiments", "one or more embodiments", and so forth, means that a particular element described in connection with the embodiment is included in at least one embodiment described herein, and may or may not be present in one or more embodiments. In addition, it is to be understood that the described elements may be combined in any suitable manner in the various embodiments.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described. Additionally, it will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Vacuum insulated glazing (VIG) units include two spaced apart glass panes that enclose a cavity therebetween. The glass panes are interconnected by a peripheral seal that can be made of fused solder glass, for example. VIG units with fused solder glass peripheral seals can be manufactured by depositing glass frit, in a solution (e.g., frit paste), around the periphery of one or more of the glass panes. This glass frit paste ultimately forms the glass solder edge seal. A second glass pane is brought down on the first glass pane so as to sandwich the glass frit paste between and around the peripheral region of the two glass panes. The entire pre-sealed assembly including the glass panes and the seal material (e.g., glass frit in solution or paste) can be heated at high temperature (e.g., 500° C.) to melt the glass frit, which wets the surfaces of the glass panes and ultimately forms a hermetic peripheral or edge seal.

Some sealing materials or sealing compositions can degrade at higher temperatures, and thus lower sealing temperatures can be advantageous. Sealing materials can also crystallize at higher temperatures, which may compromise or degrade the hermetic peripheral seal. However, the lower sealing temperatures sometimes can be insufficient to suitably remove and/or burn off the hydrocarbons that can be present, for example, in the binder component of the sealing material. These impurities can weaken the chemical adhesion of the glass panes to the peripheral seal material once formed. Additionally, residual hydrocarbon species can be entrapped within the peripheral seal material which can lead to the formation of a porous glass.

Additionally, high temperature sealing can adversely affect the compressive stress at the surface(s) of the glass panes, for example the compressive stresses obtained via annealing and/or tempering. In other words, high temperature processing can reduce the strength of tempered glass panes. For example, a glass pane can have a compressive stress of about 120 mega Pascal (MPa) before thermal processing and a compressive stress of about 70 MPa after high temperature thermal processing.

The inventors have surprisingly discovered that heating the seal material under a flow of a gas comprising a reactive oxygen species, for example ozone, from room temperature through binder burnout (e.g., before the seal material melts and forms the peripheral seal) can provide a superior peripheral seal. The seal material also melts at a lower temperature to form the peripheral seal after using the gas comprising the reactive oxygen species during binder burnout, to provide more efficient processing. The lower temperatures also can preserve the compressive stress of the glass panes.

Provided herein is a method of manufacturing a vacuum insulated glazing (VIG) unit that includes providing first and second substantially parallel glass panes. Any suitable glass can be used for the glass panes, for example a soda lime silica glass or an alkali aluminosilicate glass. The glass panes can have the same or different thickness, and the thickness can be 1-6 mm, 2-4 mm, or 2.5-3.5 mm. The glass panes are substantially transparent to visible light (i.e. at least about 50% transparent, more preferably at least about 70% transparent, more preferably at least about 80% transparent, and most preferably at least about 90% transparent), although they may be tinted in one or more embodiments.

The glass panes can be annealed and/or tempered to increase strength. The term "tempered glass pane" as used herein is understood to mean a glass pane in which compressive stresses have been introduced into the surface(s) of the glass pane. For glass to be considered strengthened this compressive stress on the surface(s) of the glass can be a minimum of 69 MPa (10,000 psi) and may be higher than 100 MPa, for example 110 MPa or 120 MPa.

The glass panes can be annealed, for example annealed at a temperature of at least 375° C. Tempered glass, also known as toughened glass, may be produced from annealed glass by means of a strengthening procedure, which e.g. may be thermal tempering, chemical tempering, ion implantation, or plasma tempering with the purpose of introducing the compressive stresses into the surface(s) of the glass pane. After tempering, the stress developed by the glass can be high, and the mechanical strength of tempered glass can be four to five times greater than that of annealed glass.

Thermally tempered glass may be produced by means of a furnace in which an annealed glass pane is heated to a temperature of approximately 600-700° ° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which cause the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane. Methods of plasma tempering are disclosed e.g. in US 2013/0059087 A1 and in US 2013/0059160 A1.

In one or more embodiments, one or more of the glass panes further includes an optical coating. In an embodiment, one or more of the glass panes has a low-emissivity (low-e) coating. Low-e coatings can include a layer of an infrared-reflecting film and optionally one or more layers of a transparent dielectric film. The infrared-reflecting film can comprise a conductive metal such as silver, gold, copper, or a combination thereof, to reduce the transmission of heat through the coated glass pane. The optional dielectric film layer(s) can be used to anti-reflect the infrared-reflecting film and to control other properties and characteristics of the coating, such as color and durability. Suitable dielectric materials include zinc oxide, tin oxide, indium oxide, bismuth oxide, titanium oxide, or the like. Optical coatings can be applied using a conventional film-forming process such as physical or chemical vapor deposition or, for larger glass panes, via lamination.

The method of manufacturing the VIG unit further includes disposing a sealing composition around a periphery of first and second substantially parallel glass panes to define a cavity and form a pre-sealed VIG unit. The sealing composition can be deposited around the periphery of the first glass pane and then the second glass pane can be brought down on the first glass pane so as to sandwich the sealing composition between and around the periphery of the first and second glass panes. The "periphery" means that the sealing composition is at least partially located at or near (e.g., within about two inches) an edge of the glass panes, and does not mean that the sealing composition is located at the absolute edge of the glass panes. The term "pre-sealed VIG unit" means an intermediate product where the sealing composition is sandwiched between the first and second glass panes, but before the VIG's edges are hermetically sealed to form the peripheral seal.

The sealing composition can include a metal or a metal alloy, and a binder, but other suitable compositions can also be used. In one or more embodiments, the sealing composition is a soldering material, for example a glass frit powder with a low melting temperature. For example, the sealing composition can comprise a glass frit powder with a low melting temperature, where the paste further comprises of about 70 wt % of an organic binder, inorganic fillers, and solvents, for example water or alcohol.

In one or more embodiments, the sealing composition comprises less than 0.1 wt % of lead. The sealing composition may also be lead free.

In one or more embodiments, the glass frit powder comprises vanadium oxide, barium oxide, zinc oxide, bismuth oxide, aluminum oxide, silicon oxide, silver chloride, silver oxide, boron oxide, yttrium oxide, tin fluoride, tin oxide, strontium oxide, copper chloride, copper oxide, cerium oxide, indium oxide, magnesium oxide, chromium oxide, iron oxide, cobalt oxide, sodium oxide, manganese oxide, titanium oxide, germanium oxide, thallium oxide, tellurium oxide, tantalum oxide, molybdenum oxide, niobium oxide, tellurium oxide, an alloy thereof, or a combination thereof. The soldering material may be provided as a combination of two different materials comprising glass solder frit with different thermal expansion coefficients (CTE) that are adjusted to correspond to the thermal expansion coefficients of the bonded parts.

In one or more embodiments, the glass frit powder is an indium-based powder, for example Indalloy No. 53 available from Indium Corp. in paste form having a composition of 67% Bi and 33% In (% by weight), Indalloy No. 1 from Indium Corp. in paste form having a composition of 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In, and 2.8% Ag, Indalloy No. 2 available from Indium Corp. in paste form having a composition of 80% In, 15% Pb and 5% Ag, or Indalloy No. 3 available from Indium Corp. in paste form having a composition of 90% In and 10% Ag. The glass frit powder can have a particle size in the range of from 1 to 150 μm, more preferably 10 to 50 μm.

The sealing composition can be provided as a slurry or paste that is disposed around the periphery and sandwiched between the peripheral portions of the first and second glass panes, wherein the sealing composition is subsequently heated to form the hermetic peripheral seal. The heating to form the hermetic peripheral seal can be performed under static or dynamic vacuum. In one or more embodiments, the seal is formed before application of a vacuum, during application of a vacuum, or after application of a vacuum. The vacuum can be applied by any suitable method, for example via an evacuation port in one of the glass panes or by positioning the glass panes in a vacuum oven.

The binder can be any suitable material, including but not limited to nitrocellulose, methylcellulose, hydroxypropyl methylcellulose, hydroxypropyl cellulose, bentonite H, laponite XL2, laponite RD, poly(alkylene carbonate)s such as poly(ethylene carbonate), poly(propylene carbonate) poly (propylene-cyclohexene carbonate), poly(cyclohexene carbonate), poly(butylene carbonate), or the like, or combinations thereof.

The sealing composition can comprise from 80 to 99 wt % of the glass frit powder and from 0.001 to 20 wt % of the binder, more preferably from 80 to 95 wt % of the glass frit powder and from 0.25 to 5 wt % of the binder, even more preferably from 90 to 98 wt % of the glass frit powder and from 0.5 to 1.5 wt % of the binder, wherein the amounts are based on the total weight of the sealing composition.

The sealing composition can further include wetting agents in an amount of up to 5 wt % to improve the wetting of the glass frit powder after mixing. Suitable wetting agents include poly(ethylene glycol) alkyl ethers and silicone additives.

Dispersants can be added to the sealing composition. One type of dispersant is a surfactant, such as a polyphosphate, phosphate ester, metal silicate, or metal carbonate which may be included in an amount of up to 2 wt %. Another class of dispersant is a water soluble polymeric dispersant such as polyoxyethylene, poly(vinyl alcohol), poly(acrylic acid), or poly(vinylpyrrolidone) which may be included in an amount of up to 5 wt %.

The sealing composition can further include antifoam agents in an amount of up to 1 wt % to minimize foaming during mixing and/or dispensing, which could potentially lead to bubble formation. Defoamers based on polyoxyethylene or silicones can be used.

The sealing composition can also include fillers to adjust the CTE and/or viscosity of the composition. Suitable fillers include, but are not limited to, $Li_2O \cdot Al_2O_3 \cdot 2SiO_2$, ZnAs glass-ceramic, LiZnMgAs, $Zr_4(WO_4)(PO_4)_2$, $K_2O \cdot Al_2O_3 \cdot 2SiO_2$, $ZrO_2$, $(Co,Mg)_2 \cdot P_2O_7$, or the like, or combinations thereof.

The sealing composition is disposed around the periphery to form the pre-sealed VIG unit, and the flow of the gas comprising the reactive oxygen species is started. The sealing composition is subsequently heated at a first temperature, while continuing the flow of the gas comprising the reactive oxygen species. The first temperature can be from 150° C. to 360° C., preferably from 180° C. to 340° C., more preferably from 220° ° C. to 320° C.

In one or more embodiments, the gas comprising the reactive oxygen species is flowed into the cavity before the sealing composition reaches a temperature of 250° C., such as a temperature of 200° C., or such as a temperature of 150° C.

In one or more embodiments, the ramp time to achieve the first temperature can be from 1 minute to 90 minutes, preferably 10 minutes to 60 minutes, more preferably 15 minutes to 45 minutes. In one or more embodiments, the ramp time is not limited and can be any time sufficient to obtain the desired first temperature.

The sealing composition is then held at the first temperature, or burnout temperature, while continuing the flow of the gas comprising the reactive oxygen species. The hold time can be from 10 minutes to 90 minutes, preferably 15 minutes to 60 minutes, more preferably 20 minutes to 45 minutes.

The gas comprising the reactive oxygen species is flowed into the cavity while heating the sealing composition to the first temperature and for at least a portion of the hold time. In one or more embodiments, the gas comprising the reactive oxygen species comprises a mixture of ozone and a second gas, for example a mixture of ozone and oxygen. The ozone containing gas can include, for example, from 1 to 15 wt % of ozone, preferably from 4 to 12 wt % of ozone, more preferably from 6 to 10 wt % of ozone, based on the total weight of the mixture. In one or more embodiments, the ozone can be generated by an ozone generator using pure oxygen from an oxygen such, such as, for example, a compressed oxygen tank. In one or more embodiments, the ozone generator can alternatively generate the ozone gas by processing ambient air.

In one or more embodiments, the reactive oxygen species can include, without limitation, oxygen ions generated by a suitable source, for example a plasma or electric arc.

The flow rate of the gas comprising the reactive oxygen species can be adjusted to maintain a suitable concentration of reactive oxygen species in the cavity and/or to avoid disrupting the continuity of the sealing composition between the glass panes. In one or more embodiments, the flow rate is 0.01 to 0.05 liters per second (L/s), preferably 0.015 to 0.03 L/s, more preferably 0.018 to 0.025 L/s.

In one or more embodiments, after the sealing composition has been disposed around the periphery of the first glass pane, the second glass pane is contacted to the sealing composition to provide an interior cavity and form the pre-sealed VIG unit. The pre-sealed VIG unit can be optionally transferred to a convection oven and a flow of gas comprising the reactive oxygen species is introduced into the cavity space between the glass panes. The pre-sealed VIG unit is then heated from room temperature to a first temperature under a continued flow of gas comprising the reactive oxygen species. The first temperature is alternatively named the burnout temperature, while the heating from room temperature to the burnout temperature is the ramp time. Once the convection oven reaches the burnout temperature, the oven system is held at that temperature for a predetermined period of time while the gas comprising the reactive oxygen species continues to flow into the cavity space of the pre-sealed VIG unit.

The gas comprising the reactive oxygen species flows into the cavity and then exits the pre-sealed VIG unit. In one or more embodiments, the gas comprising the reactive oxygen species flows through the sealing composition, for example through a plurality of pores in the sealing composition. In one or more embodiments, the gas comprising the reactive oxygen species flows around the sealing composition, for example through one or more pores that are present between the sealing composition and an inner surface of at least one of the glass panes. In a one or more embodiments, the gas comprising the reactive oxygen species flows through the sealing composition and around the sealing composition. Without being bound by theory, when the pre-sealed VIG unit is heated at the burnout temperature, the binder begins to decompose and the remaining frit material is in powder form allowing good flow.

The flow of the gas comprising the reactive oxygen species may be subsequently stopped, and the sealing composition heated to a second temperature, typically the melting temperature of the glass frit powder, in an oxygen-containing atmosphere to form the peripheral seal. In one or more embodiments, the second temperature can be from 300° ° C. to 550° C., preferably from 325° C. to 500° C., more preferably from 350° C. to 450° C. The sealing composition, or frit material that is derived from the sealing composition, is then melted into place and cooled. Once the frit material has cooled below a molten temperature, a vacuum can be applied as cooling continues, and a frit material is formed that is bonded (e.g., fused) to the first and second glass panes, which can include regions between the glass panes and around the periphery of both glass panes. In one or more embodiments, vacuum is applied before, during, and/or after the melting of the sealing composition. The frit material is derived from the sealing composition, and the binder that was originally present in the sealing composition has been substantially or completely burned off. The peripheral seal is a hermetic seal.

In one or more embodiments, the second temperature is less than a second temperature that is necessary to form a peripheral seal using a comparable sealing composition that is prepared without flowing the gas comprising the reactive oxygen species into the cavity while heating at the first temperature.

In one or more embodiments, the second temperature is at least 20° C. less than a second temperature that is necessary to form a peripheral seal using a comparable sealing composition that is prepared without flowing the gas comprising the reactive oxygen species into the cavity while heating at the first temperature.

In one or more embodiments, the second temperature is 30° ° C. to 50° C. less than a second temperature that is necessary to form a peripheral seal using a comparable sealing composition that is prepared without flowing the gas comprising the reactive oxygen species into the cavity while heating at the first temperature.

The VIG unit can also include an evacuation port on an outer surface of one of the glass panes. Alternatively, an evacuation port of a suitable kind may be provided in the peripheral seal between the two glass panes. The sealed cavity can be evacuated through the evacuation port, wherein the evacuation port is sealed after evacuation of the sealed cavity. In one or more embodiments, the VIG unit is heated (e.g., baked) to a temperature of at least 200° C., for example from 200° ° C. to 300° C., preferably from 200° ° C. to 250° C., prior to sealing the evacuation port. In one or more embodiments, the VIG unit is evacuated at 250° C. and, after continuous application of a dynamic vacuum, sealed at 200° C.

In one or more embodiments, the gas comprising the reactive oxygen species can be introduced to the cavity via the evacuation port. The gas comprising the reactive oxygen species continues flowing into the cavity during the ramp time while heating to the burnout temperature and during the burnout period. Without being bound by theory, the gas comprising the reactive oxygen species reacts with residual hydrocarbons and/or polymers to oxidize residual carbon compounds and convert them to more volatile CO or $CO_2$ that may then be flushed from the cavity by the continued flow of the gas comprising the reactive oxygen species.

In one or more embodiments, the treatment with reactive oxygen species during thermal ramping and burnout provides a sealing composition (or frit material derived therefrom) that can be heated to a lower peak temperature to form the peripheral seal. In one or more embodiments, the second temperature is 30° ° C. to 50° C. lower than a second temperature that is necessary to form a peripheral seal using a comparable sealing composition that is prepared without flowing the gas comprising the reactive oxygen species into the cavity while heating at the first temperature. Without being bound by theory, the treatment with reactive oxygen species during heating and burnout ultimately enables the formation the peripheral seal under extremely mild conditions that can minimize or reduce the degradation of the peripheral seal material during the melting process.

In one or more embodiments, the treatment with reactive oxygen species during thermal ramping and burnout reduces the amount of compressive strain that is lost during the thermal processing to form the peripheral seal. In one or more embodiments, the compressive strain is reduced by 60%, 55%, 50%, 45%, 40%, 35%, 30%, or 25% by using the treatment with reactive oxygen species. In some embodiments, the compressive strain loss in a glass pane of a VIG unit that is prepared using the disclosed treatment with reactive oxygen species is less than the compressive strain loss in a comparable glass pane of a comparable VIG unit that is prepared without the disclosed treatment with reactive oxygen species. In one or more embodiments, the compressive strain loss is 5%, 10%, 15%, 20%, 25%, or 30% less in the glass pane of the VIG unit prepared using the disclosed treatment with reactive oxygen species.

The method of manufacturing the VIG unit can further include disposing a plurality of pillars, or spacers, between the first and second glass panes. In some embodiments, the method of disposing the pillars includes disposing the pillars on the first or second glass pane and then placing the other of the first or second glass panes on the opposite side of the pillars to provide pillars that are sandwiched between the first and second glass panes, wherein each pillar contacts the first and second glass panes on opposite sides of the pillar. In one or more embodiments, the plurality of pillars are arranged on the first glass pane before the sealing composition is disposed thereon, and then the second glass pane is brought down to form the cavity having the pillars situated between the first and second glass panes. In one or more embodiments, the plurality of pillars are arranged on the first glass pane after the sealing composition is disposed thereon, but before the second glass pane is brought down to form the cavity having the pillars situated between the first and second glass panes.

The pillars can be arranged in any formation or pattern without limitation. For example, the pillars can be oriented in a grid pattern, honeycomb pattern, circular pattern, irregular pattern, or combinations thereof. In one or more embodiments, the pillars are disposed on the first or second glass pane with an inter-pillar spacing that is the same or different, and can be 15-120 mm, 25-80 mm, 15-50 mm, 30-60 mm, or 30-45 mm, as measured from either the outer edges or center points of adjacent pillars. In one or more embodiments, the pillar density (number of pillars per area) is higher or lower near the edges of the glass panes.

In one or more embodiments, the pillar comprises a metal or a metal alloy. The metal or metal alloy can include, but is not limited to, iron, tungsten, nickel, chromium, titanium, molybdenum, carbon steel, chromium steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride, zirconia, silicon carbide, or the like. In one or more embodiments, the open structure can be made from a metal alloy that is an austenitic nickel-chromium-based superalloy. Other suitable metal or metal alloys include low carbon austenitic chromium-nickel stainless steels including SS 301, SS 304, SS 308, and SS 316, and high-carbon martensitic steels including 440C. Tool steels may also be used for the manufacture of pillars, which include, but are not limited to, unalloyed tool steels with small amounts of tungsten, for example C45W, C70W and C85W, low alloy cold work tool steels like 100Cr6 and alloy cold work tool steels like X 210 Cr 12, X 155 CrVMo 12 1, and X 36 CrMo 17.

The compressive yield strength of the pillar can be greater than 400 MPa, greater than 600 MPa, greater than 800 MPa, greater than 1 GPA, or greater than 2 GPa at 20° C. In one or more embodiments, the compressive yield strength is 400 MPa to 110 GPa, 400 MPa to 50 GPa, 400 MPa to 25 GPa, 400 MPa to 12 GPa, 1 to 110 GPa, 1 to 50 GPa, 1 to 25 GPa, or 1 to 12 GPa at 20° C. In a some embodiment, the pillar is made of a metal or a metal alloy having a compressive yield strength greater than 1 GPa at 20° C.

The pillar can have a thermal conductivity of less than 40 W $m^{2\circ}$ $K^{-1}$, less than 20 W $m^{2\circ}$ $K^{-1}$, less than 10 W $m^{2\circ}$ $K^{-1}$, or less than 5 W $m^{2\circ}$ $K^{-1}$. In one or more embodiments, the pillar has a thermal conductivity of at least 0.1 W $m^{2\circ}$ $K^{-1}$.

The pillar can be manufactured using any suitable method. In one or more embodiments, the pillar is prepared by additive manufacturing, wherein a laser or other high energy source is directed at a metal powder bed to fuse particles of the metal powder. The fusion of particles may include the melting of particles by selective laser melting, (SLM), or sintering of particles by selective laser sintering (SLS) or micro laser sintering (MLS). In a some embodiment, the process for the fusion of particles of a metal powder is conducted repeatedly to form consecutive layers of the metal powder. For example, during manufacturing, a thin layer of metal powder can be applied to a build platform. The powder can be selectively fused by a laser process that is precise to each cross section. The building platform can be subsequently lowered, and the procedure of powder coating, fusing, and platform lowering can be repeated to form the material in a layer by layer manner, until the pillar is completed.

In one or more embodiments, the pillar can be fabricated using a suitable molding process. The shape of the pillar is determined by the mold cavity, which can have the inverse shape corresponding to the dimensions of the desired shape of the pillar.

In one or more embodiments, the pillar can be prepared by cutting or carving material away from a solid metal substrate, for example by laser cutting or electric discharge machining (EDM) to obtain the desired shape of the pillar.

In still one or more embodiments, the pillar can be formed by an electrodeposition process, for example an electroforming process. Electroforming is the metal forming process where metal is grown by electrodeposition onto a substrate. An electrolytic bath is used to deposit the metal onto a conductive patterned surface, e.g., formed by means of a non-conductive mask applied to a conductive surface.

The pillars can optionally be coated. The coating material can include metal or semi-metals such as indium, silicon, germanium, silver, tin, lead, bismuth, antimony, strontium, and combinations thereof. In one or more embodiments, the coating material can include aluminum, chromium, copper, tungsten, molybdenum, or a combination thereof. In some embodiments, the coating material can include a chalcogen that is sulfur, selenium, tellurium, or a combination thereof. In one or more embodiments, the coating material comprises tungsten disulfide, molybdenum disulfide, niobium disulfide, tantalum disulfide, molybdenum diselenide, tungsten diselenide, niobium diselenide, tantalum diselenide, or a combination thereof.

The coating material can be derived from the appropriate precursor material. For example, a tungsten disulfide coating layer provided by DC sputtering can be derived from a tungsten source and a sulfur source, for instance a tungsten sputtering target and sulfur powder. In one or more embodiments, a component of the coating layer can be provided using a reactive gas, for example the sulfur source for DC sputtering can be hydrogen sulfide.

In one or more embodiments, the pillars can be cleaned after a coating layer is applied. For example, residual coating material can be removed by washing in suitable solvent or bath, sonication in a suitable fluid, or by magnetic particle removal.

After cooling from the second temperature, the peripheral seal is formed (e.g., fused) to provide a hermetically sealed cavity between the first and second glass panes. Low gaseous thermal conduction may be achieved when, for example, the pressure in the sealed cavity is reduced to a level equal to or below about $10^{-4}$ bar or $10^{-5}$ bar, more preferably below $10^{-6}$ bar, and most preferably below $10^{-7}$ bar of atmospheric pressure.

Also provided herein is a VIG unit prepared according to the method disclosed herein. The VIG unit includes first and second substantially parallel glass panes; a peripheral seal attached around a periphery of the first and the second glass panes, thereby forming a sealed cavity between the first and the second glass panes; and optionally a plurality of pillars disposed in the sealed cavity between the first and the second glass panes.

Various articles may be prepared to include the VIG unit described herein. In one or more embodiments, a window includes the VIG unit. The window may further include a frame. The window can be used for residential or commercial purposes. The articles including the VIG unit can also be used for particular applications. For example, one or more embodiments provides the use of the VIG unit for a window. One or more embodiments provides use of the window for a fixed or ventilating window of a commercial or residential building. One or more embodiments provides use of the window for a roof or skylight window, for example a fixed or ventilating window for a roof or skylight. Still one or more embodiments provides use of the window for a vertical window application, such as for use on the side of a commercial or residential building. The VIG unit described herein can also be used for other applications that use a window or transparent screen, for example a viewport, console screen, time piece, vehicle, or the like.

This disclosure is further illustrated by the following examples, which are non-limiting.

EXAMPLES

Example 1

Figure 2:
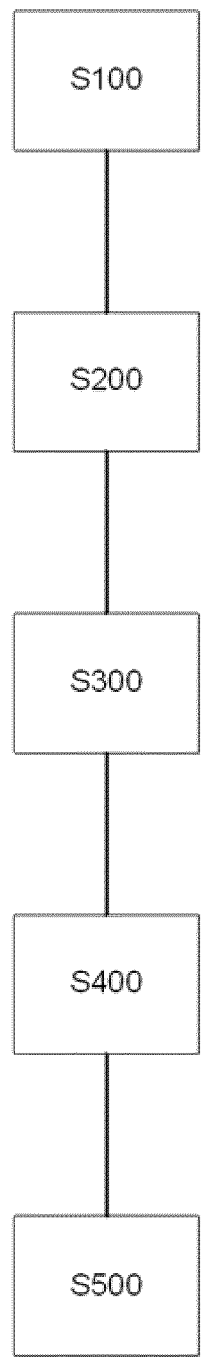
FIG. 2 is a flowchart illustrating a method of manufacturing a VIG unit according to an exemplary embodiment.

FIG. 2 is a flowchart illustrating the method of Example 1. First and second glass panes (soda lime silica, 4 mm) were prepared by annealing and tempering. The first glass pane was coated with a low-e coating comprising silver. A pre-sealed VIG unit was then assembled and included a first glass pane and a second glass pane arranged in parallel and having a plurality of pillars (0.5 mm×0.2 mm; 304 stainless steel with a tungsten disulfide coating) arranged between of the inner surface of the first glass pane and the inner surface of the second glass pane, and is provided in S100. A sealing composition (frit composition, solvent, and binder) was disposed around the periphery of the glass panes to form a cavity in S200. The frit composition included vanadium oxide and tellurium oxide. The binder was QPack 40 (EMPOWER MATERIALS).

The gas comprising a reactive oxygen species was prepared by feeding oxygen gas into a BMT 803N ozone generator to provide an ozone containing gas that was a mixture containing 8 wt % of ozone in oxygen at flow rate of 0.02 L/minute. The ozone containing gas was flowed into the cavity via an evacuation port on the first glass pane. A cup was sealed to the evacuation port using coated graphite and the ozone source/vacuum source were connected to the cup.

The pre-sealed VIG unit was transferred to a convective oven and heated from room temperature to 300° C. over the course of 40 minutes in S300. The oven was then held at 300° ° C. for 30 minutes, and then the flow of the ozone containing gas was stopped. The oven was heated to 360° C. and held at that temperature for 40 minutes in S400, and subsequently cooled to 250° C. and evacuated in S500. While vacuum was applied to the cavity via the evacuation hole, the cavity was sealed under vacuum.

Comparative Example 1

The same procedure as Example was used, except the ozone containing gas (or other gas comprising a reactive oxygen species) was not used. It was necessary to hold the oven at 390° ° C. to form the peripheral seal. FIG. 1 is the temperature versus time profile for Example 1 ("Ozone process") and Comparative Example 1 ("Normal process"), and shows that the ozone treatment enables the frit melting step to be performed at a temperature that is 30° C. less than the cased without the ozone treatment.

This disclosure further encompasses the following aspects.

Aspect 1. A method of manufacturing a vacuum insulated glazing (VIG) unit, the method comprising disposing a sealing composition around a periphery of first and second substantially parallel glass panes to define a cavity and form a pre-sealed VIG unit; flowing a gas comprising a reactive oxygen species into the cavity; heating the sealing composition to a first temperature; and heating the sealing composition to a second temperature to form the peripheral seal and a sealed cavity between the first and second glass panes.

Aspect 2. The method of aspect 1, wherein the first temperature is from 150° C. to 360° C., preferably from 180° C. to 340° C., more preferably from 220° C. to 320° C.; and the second temperature is from 300° ° C. to 550° ° C., preferably from 325° C. to 500° C., more preferably from 350° ° C. to 450° ° C.

Aspect 3. The method of aspect 1 or 2, further comprising holding the sealing composition at the first temperature from 10 minutes to 90 minutes, preferably from 15 minutes to 60 minutes, more preferably from 20 minutes to 45 minutes under the flow of the gas comprising the reactive oxygen species.

Aspect 4. The method of any one or more of aspects 1 to 3, wherein the gas comprising the reactive oxygen species comprises a mixture of ozone and a second gas, preferably a mixture of ozone and oxygen, preferably wherein the mixture is from 1 to 15 wt % of ozone, preferably from 4 to 12 wt % of ozone, more preferably from 6 to 10 wt % of ozone, based on the total weight of the mixture.

Aspect 5. The method of any one or more of aspects 1 to 4, further comprising flowing the gas comprising the reactive oxygen species into the cavity through an evacuation port on an outer surface of the first or the second glass pane.

Aspect 6. The method of any one or more of aspects 1 to 5, wherein the sealing composition comprises a metal or a metal alloy, preferably a glass frit powder; and a binder.

Aspect 7. The method of any one or more of aspects 1 to 6, further comprising disposing a plurality of pillars between the first and second glass panes before the step of disposing the sealing composition.

Aspect 8. The method of any one or more of aspects 1 to 7, wherein the second temperature is 30° ° C. to 50° C. less than a second temperature that is necessary to form a peripheral seal using a comparable sealing composition that is prepared without flowing the gas comprising the reactive oxygen species into the cavity while heating at the first temperature.

Aspect 9. The method of any one or more of aspects 1 to 8, wherein at least one of the first and the second glass panes is a tempered glass pane.

Aspect 10. The method of any one or more of aspects 1 to 9, further comprising discontinuing the flow of the gas comprising the reactive oxygen species before heating the sealing composition to the second temperature.

Aspect 11. The method of any one or more of aspects 1 to 10, wherein the sealing composition is heated to the second temperature in the presence of substantially no reactive oxygen species to form the peripheral seal.

Aspect 12. The method of any one or more of aspects 1 to 11, further comprising baking the vacuum insulated glazing (VIG) unit at a third temperature subsequent to forming the peripheral seal.

Aspect 13. The method of aspect 12, wherein the third temperature is at least 200° C., preferably from 200° ° C. to 300° C., more preferably from 200° ° C. to 250° ° C.

Aspect 14. A vacuum insulated glazing (VIG) unit manufactured according to the method of any one or more of aspects 1 to 13.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of manufacturing a vacuum insulated glazing (VIG) unit, the method comprising:
   disposing a sealing composition around a periphery of first and second substantially parallel glass panes to define a cavity and form a pre-sealed VIG unit, wherein the sealing composition comprises a glass frit and a binder;
   flowing a gas comprising a reactive oxygen species into the cavity while heating the sealing composition to a first temperature, wherein the first temperature is a burnout temperature at which the binder in the sealing composition is burned off; and;
   heating the sealing composition to a second temperature to form a peripheral hermetic seal and a sealed cavity between the first and second glass panes, wherein the second temperature is a melting temperature of the glass frit.

2. The method of claim 1, wherein the second temperature is
   at least 20° C. less than a second temperature that is necessary to form a comparable peripheral hermetic seal using the sealing composition, wherein the comparable peripheral hermetic seal is prepared without flowing the gas comprising the reactive oxygen species into the cavity while heating at the first temperature.

3. The method of claim 1, wherein
the first temperature is from 150° ° C. to 360° C.; and
the second temperature is from 300° ° C. to 550° C.

4. The method of claim 1, wherein the gas comprising the reactive oxygen species is flowed into the cavity before the sealing composition reaches a temperature of 250° C.

5. The method of claim 1, further comprising holding the sealing composition at the first temperature from 10 minutes to 90 minutes under the flow of the gas comprising the reactive oxygen species.

6. The method of claim 1, wherein the gas comprising the reactive oxygen species comprises a mixture of ozone and a second gas.

7. The method of claim 1, further comprising flowing the gas comprising the reactive oxygen species into the cavity through an evacuation port on an outer surface of the first or the second glass pane.

8. The method of claim 1, wherein the sealing composition comprises at least one of:
a metal or a metal alloy; or
less than 0.1 wt % of lead, wherein amount is based on total weight of the sealing composition.

9. The method of claim 1, wherein the sealing composition comprises about 70 wt % of a combination of an organic binder, inorganic fillers, and solvents, wherein amount is based on total weight of the sealing composition.

10. The method of claim 1, wherein the glass frit is a glass frit powder, wherein the glass frit powder comprises one or more of vanadium oxide, barium oxide, zinc oxide, bismuth oxide, aluminum oxide, silicon oxide, silver chloride, silver oxide, boron oxide, yttrium oxide, tin fluoride, tin oxide, strontium oxide, copper chloride, copper oxide, cerium oxide, indium oxide, magnesium oxide, chromium oxide, iron oxide, cobalt oxide, sodium oxide, manganese oxide, titanium oxide, germanium oxide, thallium oxide, tellurium oxide, tantalum oxide, molybdenum oxide, niobium oxide, tellurium oxide, an alloy thereof, or a combination thereof.

11. The method of claim 1, wherein the sealing composition comprises two different glass frit materials, wherein each glass frit material has a different thermal expansion coefficient (CTE).

12. The method of claim 1, wherein the sealing composition comprises a glass frit powder, wherein the sealing composition comprises 80 to 99 wt % of the glass frit powder and 0.001 to 20 wt % of the binder, wherein amounts are based on total weight of the sealing composition.

13. The method of claim 1, further comprising disposing a plurality of pillars between the first and second glass panes.

14. The method of claim 1, wherein at least one of the first and the second glass panes is a tempered glass pane.

15. The method of claim 1, further comprising discontinuing the flow of the gas comprising the reactive oxygen species before heating the sealing composition to the second temperature.

16. The method of claim 1, wherein the sealing composition is heated to the second temperature in the presence of substantially no reactive oxygen species to form the peripheral seal.

17. The method of claim 1, further comprising baking the vacuum insulated glazing (VIG) unit at a third temperature subsequent to forming the peripheral seal.

18. The method of claim 17, wherein the third temperature is at least 200° C.

* * * * *